United States Patent [19]

Wamprecht et al.

[11] Patent Number: 5,064,922
[45] Date of Patent: Nov. 12, 1991

[54] COPOLYMERS CONTAINING AMINO GROUPS AND A PROCESS FOR THEIR PRODUCTION

[75] Inventors: Christian Wamprecht, Krefeld; Josef Pedain, Cologne; Harald Blum, Krefeld, all of Fed. Rep. of Germany

[73] Assignee: Bayer Atkiengesellschaft, Leverkusen, Fed. Rep. of Germany

[21] Appl. No.: 573,611

[22] Filed: Aug. 27, 1990

[30] Foreign Application Priority Data

Sep. 1, 1989 [DE] Fed. Rep. of Germany ....... 3928991

[51] Int. Cl.$^5$ .................... C08F 222/40; C08F 222/06
[52] U.S. Cl. .................... 526/262; 525/327.6
[58] Field of Search .................... 526/262; 525/327.6

[56] References Cited

U.S. PATENT DOCUMENTS

| | | | |
|---|---|---|---|
| 4,426,491 | 1/1984 | Gardner | 524/878 |
| 4,464,522 | 8/1984 | Plum | 526/301 |
| 4,525,521 | 6/1985 | DenHartog et al. | 524/517 |
| 4,659,770 | 4/1987 | Vasta | 524/553 |
| 4,699,936 | 10/1987 | Vasta | 523/400 |

Primary Examiner—Joseph L. Schofer
Assistant Examiner—Wu C. Cheng
Attorney, Agent, or Firm—Joseph C. Gil; Thomas W. Roy

[57] ABSTRACT

The present invention relates to copolymers having a weight average molecular weight ($M_w$) of 1500 to 75,000, prepared from olefinically unsaturated compounds and containing 0.1 to 4.5% by weight of primary amino groups in the form of structural units corresponding to formula I

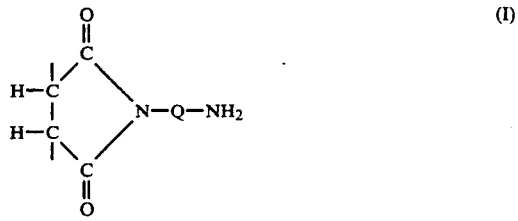

wherein
Q is a saturated aliphatic-cycloaliphatic hydrocarbon radical of the type obtained by removing the amino groups from an aliphatic-cycloaliphatic diprimary diamine containing an amino group attached to a primary carbon atom and an amino group attached to a secondary or tertiary carbon atom.

The present invention also relates to a process for the production of these copolymers.

3 Claims, No Drawings

COPOLYMERS CONTAINING AMINO GROUPS AND A PROCESS FOR THEIR PRODUCTION

BACKGROUND OF THE INVENTION

1. Field of the Invention

This invention relates to new copolymers of olefinically unsaturated monomers containing primary amino groups and to a process for the production of these copolymers.

2. Description of the Prior Art

Copolymers of olefinically unsaturated monomers containing primary amino groups are known. EP-A-0 101 962 for example describes polymers containing primary amino groups, a process for their production and their use. These aminofunctional polymers are produced by reacting a hydroxyl group-containing ester of an $\alpha,\beta$-olefinically unsaturated mono- or dicarboxylic acid and an dihydric alcohol (such as hydroxyethyl acrylate) with a diisocyanate at an equivalent ratio of NCO to OH groups of greater than 1:1 in a first step. This produces an $\alpha,\beta$-olefinically unsaturated mono- or diisocyanate which, in a second step, is subjected to radical polymerization with other monomers to form an isocyanate-functional copolymer. In a third step, the isocyanate groups of the copolymer are converted into ammonium salts by reaction with excess mineral acid (concentrated HCl) and water with elimination of $CO_2$ and, in a fourth step, the ammonium salts are neutralized by the addition of a base (methanolic KOH). Copolymers containing free amino groups are obtained.

The disadvantage of this process is that the isocyanate-functional monomers obtained in the first step are not completely uniform 1:1-adducts, which can result in crosslinked products in the second step (the polymerization step) unless an elaborate purification process has been carried out beforehand. Another disadvantage lies in the very involved production of the amino-functional polymers in a total of four reaction steps. Another disadvantage of this known process is that because of the severe hydrolysis and neutralization conditions (concentrated HCl, KOH), not only are the isocyanate groups susceptible to hydrolysis, the (meth)acrylate units are also susceptible to undergoing partial hydrolysis, resulting in degradation of the polymer.

EP-A-0 179 954 describes two-component coating systems based on amino-functional and epoxy-functional polyacrylate systems. In this case, the amino-functional polymer is produced by preparing a carboxyl-functional copolymer in a first step using (meth)acrylic acid as the functional monomer together with other monomers. To introduce the amino groups, this copolymer is reacted with propylene imine in a ring-opening reaction accompanied by the formation of primary amino groups. A serious disadvantage of this process is that propylene imine, like ethylene imine, is an extremely dangerous substance which has been proven to be carcinogenic in animal tests.

U.S. Pat. Nos. 4,659,770 and 4,699,936 describe amino-functional copolymers which are used as binder components in two-component paints. They are produced by initially synthesizing aminofunctional (meth)acrylate monomers by the reaction of alkane diol di(meth)acrylates (such as hexane diol diacrylate) with diamines in quantitative ratios which form 1:1 adducts containing both free amino groups and also unsaturated (meth)acrylate groups. These amino-functional monomers are then copolymerized with other unsaturated monomers to obtain the amino-functional copolymers. The disadvantage of this process is that difficulties are involved in the production and processing of the amino-functional monomers. Thus, relatively high molecular weight oligomers may also be formed in addition to the desired 1:1 adducts. These oligomers promote gelation by acting as unsaturated crosslinking agents in the subsequent copolymerization process. Another disadvantage is that monomers containing both an unsaturated, activated (meth)acrylate double bond and a free, primary amino group are not stable in storage because both groups enter into an addition reaction with one another, even at room temperature. This addition reaction takes place considerably more quickly at elevated temperatures, for example, at the stated reaction temperatures of 90° to 100° C., so that unwanted secondary reactions resulting in gelled products can take place. Another particular disadvantage of this process is that dark-colored products are always formed when radical copolymerization processes initiated by organic peroxides are conducted in the presence of amino groups. Because of their color, these products are totally unsuitable, for example, for use as binders in high-quality paints.

An object of the present invention is to provide new copolymers containing primary amino groups which do not suffer from the above-mentioned disadvantages of the prior art. It is a further object of the present invention to provide copolymers containing amino groups which may be readily obtained without complications from safe, inexpensive and generally available raw materials and which are readily soluble in common organic solvents to form colorless or only faintly colored polymer solutions.

These objects may be achieved in accordance with the copolymers of the present invention as described in detail hereinafter.

SUMMARY OF THE INVENTION

The present invention relates to copolymers having a weight average molecular weight ($M_w$) of 1500 to 75,000, prepared from olefinically unsaturated compounds and containing 0.1 to 4.5% by weight of primary amino groups in the form of structural units corresponding to formula I

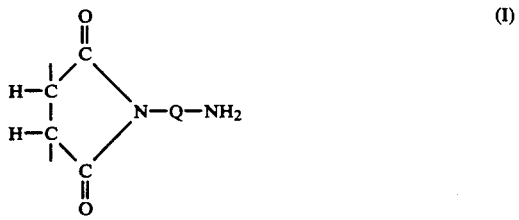

wherein

Q is a saturated aliphatic-cycloaliphatic hydrocarbon radical of the type obtained by removing the amino groups from an aliphatic-cycloaliphatic diprimary diamine containing an amino group attached to a primary carbon atom and an amino group attached to a secondary or tertiary carbon atom.

The present invention also relates to a process for the production of these copolymers by reacting in a first reaction step, a) 1 to 40 parts by weight copolymerizable anhydridefunctional monomers and b) 60 to 99 parts by weight other copolymerizable monomers corresponding to formulas (II), (III) and (IV)

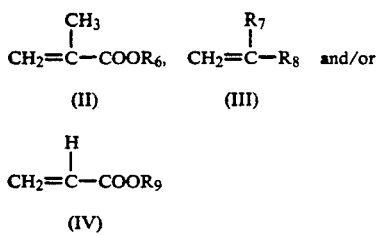

wherein $R_6$ is a linear or branched, aliphatic $C_{1-18}$ hydrocarbon radical or a $C_{2-4}$ hydroxyalkyl radical, $R_7$ is hydrogen or a methyl, ethyl, chlorine or fluorine substituent, $R_8$ is an aromatic $C_{6-12}$ hydrocarbon radical, a $C_{2-7}$ alkoxy group or an aminocarbonyl group which may contain a $C_{1-6}$ alkyl substituent which may further contain ether bridges at the nitrogen and $R_9$ corresponds to the definition given for $R_6$, but need not be identical with $R_6$, by radical-initiated copolymerization to form an anhydride-functional or anhydride- and hydroxy-functional copolymer and, in a second reaction step, reacting this copolymer with diamines corresponding to the formula

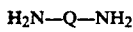

wherein Q is as defined above,
to form structural units corresponding to formula (I), wherein the quantity of diamine is sufficient to provide an equivalent ratio of amino groups attached to primary carbon atoms to acid anhydride groups of the copolymer of at least 1:1 and wherein the components and the quantitative ratios in which they are reacted are selected to provide copolymers having 0.1 to 4.5% by weight of primary amino groups.

DETAILED DESCRIPTION OF THE INVENTION

The copolymers according to the invention contain 0.1 to 4.5% by weight, preferably 0.3 to 3.0% by weight of primary amino groups and have a weight average molecular weight ($M_w$, as determined by gel permeation chromatography using polystyrene as the standard) of 1500 to 75,000, preferably 2000 to 50,000 and more preferably 2500 to 30,000. The primary amino groups are present in the copolymers in the form of structural units corresponding to formula (I) above, preferably in the form of structural units corresponding to formula (V)

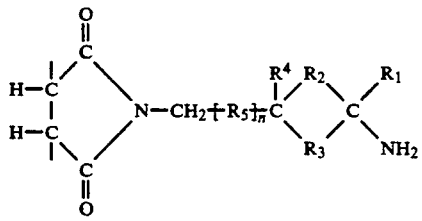

wherein $R_1$ is hydrogen or a $C_{1-4}$ alkyl radical, preferably a methyl radical, $R_2$ and $R_3$ may be the same or different and represent a difunctional, saturated, aliphatic hydrocarbon radical containing 1 to 6, preferably 1 to 5 carbon atoms, the sum of the number of carbon atoms in $R_2$ and $R_3$ being from 3 to 8, preferably 4 to 6, $R_4$ is hydrogen or a $C_{1-4}$ alkyl radical, preferably hydrogen or a methyl radical, $R_5$ is a difunctional, saturated, aliphatic hydrocarbon radical containing 1 to 4, preferably 1 to 3 carbon atoms and n is 0 or 1.

The copolymers according to the invention may be produced by the process according to the invention. In this process, an intramolecular copolymer A' containing carboxylic anhydride groups is prepared in a first reaction step and is then converted into the amino-functional copolymer A) according to the invention in a second step by reaction with suitable diamines.

The intramolecular copolymer A' is prepared from a monomer mixture containing a) 1 to 40, preferably 2 to 30 parts by weight of copolymerizable monomers containing anhydride groups and b) 60 to 99, preferably 70 to 98 parts by weight of other copolymerizable monomers corresponding to formulae (II), (III) and (IV).

Typical examples of monomers a) include itaconic anhydride and maleic anhydride; maleic anhydride is preferred.

Particularly preferred monomers b) are those corresponding to the formulas (II), (III) and (IV) wherein $R_6$ is a linear or branched, aliphatic $C_{1-8}$ hydrocarbon radical or a $C_{2-4}$ hydroxyalkyl radical, $R_7$ is hydrogen or a methyl group, $R_8$ is an aromatic $C_{6-12}$ hydrocarbon radical which may contain aliphatic substituents, a $C_{2-7}$ alkoxy group or an aminocarbonyl group which may contain a $C_{1-6}$ alkyl substituent which may further contain ether bridges at the nitrogen and $R_9$ corresponds to $R_6$.

Typical examples of suitable and preferred substituents $R_6$ and $R_9$ include methyl, ethyl, n-propyl, isopropyl, n-butyl, isobutyl, n-pentyl, n-hexyl, 2-ethylhexyl, n-octyl, n-decyl or n-dodecyl, 2-hydroxyethyl, 3-hydroxypropyl, 2-hydroxypropyl and 4-hydroxybutyl.

Typical examples of suitable and preferred substituents $R_7$ include hydrogen and methyl, ethyl, chlorine of fluorine substituents.

Typical examples of suitable and preferred substituents $R_8$ include those aliphatic radicals set forth for $R_6$, except for methyl and hydroxyalkyl radicals, and also phenyl, cyclohexyl, 2-, 3- and 4-methyl-phenyl, propoxy, n-butoxy or aminocarbonyl radicals.

Any mixtures of monomers a) and b) may be used for the production of the copolymers A', although preferred copolymers A' are those produced from a monomer mixture in which 5 to 50% by weight of component b) is based on monomers free from ester groups corresponding to the above formula and preferably 50 to 100% by weight of the monomers free from ester groups are styrene.

The copolymers A' may be produced by copolymerization of the monomers by known radical polymerization processes such as bulk or solution polymerization. The monomers are copolymerized at temperatures of 60° to 200° C., preferably 80° to 160° C. (when monomers containing hydroxyl groups are present, preferably at 80° to 140° C.) in the presence of radical formers and optionally molecular weight regulators.

The copolymerization is preferably carried out in inert solvents at a solids content of 30 to 95% by weight. Suitable solvents include esters such as propyl acetate, butyl acetate, isobutyl acetate, sec.-butyl acetate, amyl acetate, hexyl acetate, benzyl acetate, ethyl propionate, butyl propionate, isobutyl isobutyrate, ethoxypropyl acetate, propylene glycol methyl ether acetate, oxohexyl acetate (Exxate 600, available from Exxon) and oxoheptyl acetate (Exxate 700, available from Exxon); ethers such as diisopropyl ether, dibutyl ether, dioxane and dimethyl diglycol; hydrocarbons such as gasoline, turpentine oil, solvent naphtha, turpenes, hexane, heptane, octane, cyclohexane, toluene, xylene and ethyl benzene; ketones such as methylethyl ketone, methylisobutyl ketone, methyl-n-amyl ketone, methylisoamyl ketone, diethyl ketone, ethylbutyl ketone, diisopropyl ketone, cyclohexanone, methyl cyclohexanone and isophorone; and mixtures of these solvents.

Preferred solvents are those which boil at temperatures ≧110° C. under normal conditions and those which form an azeotrope with water such as xylene, butyl acetate, solvent naphtha and oxohexyl acetate.

The copolymerization may be carried out continuously or discontinuously. Typically, the monomer mixture and the initiator are uniformly and continuously introduced into a polymerization reactor and, at the same time, the corresponding quantity of polymer is continuously removed. Copolymers which are substantially chemically uniform may advantageously be produced. Copolymers which are substantially chemically uniform may also be produced by introducing the reaction mixture at a constant rate into a stirred tank without removing the polymer.

It is also possible initially to introduce part of the monomers, for example in solvents of the type mentioned, and subsequently to add the remaining monomers and auxiliaries either separately or together at the reaction temperature.

In general, the polymerization is carried out under an excess pressure of 0 to 20 bar. The initiators are used in quantities of 0.05 to 15% by weight, based on the total quantity of monomers. Suitable initiators are known and include aliphatic azo compounds such as azodiisobutyronitrile, azo-bis-2-methyl valeronitrile, 1,1'-azo-bis-1-cyclohexane nitrile and 2,2'-azo-bis-isobutyric acid alkyl ester; symmetrical diacyl peroxides such as acetyl, propionyl or butyryl peroxide, bromine-, nitro-, methyl- or methoxy-substituted benzoyl peroxides and lauryl peroxides; symmetrical peroxydicarbonates such as diethyl, diisopropyl, dicyclohexyl and dibenzoyl peroxydicarbonate; tert.-butyl peroxy-2-ethyl hexanoate; tert.-butyl perbenzoate; tert.-butyl phenyl peracetate; peroxycarbonates such as tert.-butyl-N-(phenylperoxy)-carbonate and tert.-butyl-N-(2-, 3- or 4-chlorophenylperoxy)-carbonate; hydroperoxides such as tert.-butyl hydroperoxide and cumene hydroperoxide; and dialkyl peroxides such as dicumyl peroxide, tert.-butylcumyl peroxide and di-tert.-butyl peroxide.

To regulate the molecular weight of the copolymers, regulators may be used during their production such as tert.-dodecyl mercaptan, n-dodecyl mercaptan and di-isopropyl xanthogene disulfide. The regulators may be added in quantities of 0.1 to 10% by weight, based on the total quantity of monomers.

The solutions of the copolymers A' which accumulate during the copolymerization reaction may be subjected to the modification reaction of the second stage of the process without further working up. However, it is also possible to free the copolymers from any residues of unreacted monomers still present and solvent, if any, by distillation prior to s conducting the second stage of the process.

To produce the amino functional copolymers A, the copolymers A' containing carboxylic anhydride groups are modified with suitable diamines corresponding to formula (VI)

$$H_2N-Q-NH_2 \qquad (VI),$$

preferably formula VII

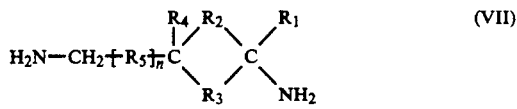

wherein
Q, $R_1$, $R_2$, $R_3$, $R_4$, $R_5$ and n have the meanings and preferred meanings defined above.

Preferred diamines include 1-amino-1-methyl-4(3)-aminomethyl cyclohexane, which is generally present in the form of a mixture of the 4- and 3-aminomethyl isomers, 1-amino-1-methyl-4-(4-aminobut-2-yl)-cyclohexane, 1-amino-1,2,2-trimethyl-3-(2-aminoethyl)-cyclopentane and 1-amino-3-aminomethyl-3,5,5-trimethyl cyclohexane (IPDA).

However, other diamines may be used and include 1-amino-1-n-butyl-3-(4-aminobut-1-yl)-cyclopentane, 1-amino-1-ethyl-4-n-butyl-4-(4-aminobut-1-yl)-cyclohexane and 1-amino-1,2-dimethyl-3-ethyl-3-aminomethyl cyclopentane.

The production of diamines containing an amino group attached to a primary carbon atom and an amino group attached to a tertiary carbon atom is described, for example, in EP-A-0 153 561 (U.S. Pat. No. 4,613,685).

To carry out the modification process according to the invention, the anhydride-functional copolymers A' and the diamines are used in quantities corresponding to an equivalent ratio of amino groups attached to a primary carbon atom to acid anhydride groups of at least 1:1, preferably 1:1 to 2:1, more preferably 1:1 to 1.5:1 and most preferably 1:1 to 1.2:1.

In the modification reaction of the second stage of the process the anhydride ring is initially opened by the amino group attached to the primary carbon atom with formation of a semiamide structure and subsequently the ring is closed with elimination of water and formation of an imide group. The second stage may be conducted in the presence of a solvent. Suitable solvents are the solvents preferably used for the production of the anhydride-functional copolymers A'.

In the process according to the invention, the diamine, which may be a mixture of several diamines, is initially introduced (optionally together with a solvent) and heated to temperatures of ≧80° C. The dissolved anhydride-functional copolymer is subsequently added at temperatures of 80° to 200° C., preferably 100° to 150° C. The reaction may be conducted such that as the polymer is added, the water of reaction is azeotropically distilled off on a water separator. In one variant of the process, the total quantity of anhydridefunctional copolymers may initially be added and the water of reaction subsequently eliminated and distilled off, preferably azeotropically.

Elimination of the water of reaction is continued at 110° to 200° C., preferably at 120° to 150° C., until either the theoretical quantity of water has been eliminated or no more water is eliminated. The elimination of water may be accelerated, for example, by an inert gas stream heated to the reaction temperature. Part II and part III were then added at the same time; part II was added over a total period of 2 hours and part III was added over a total period of 2.5 hours. The reaction mixture was then stirred for 2 hours at the reaction temperature.

The reaction temperatures and the composition of parts I to III are set forth in Table I together with the characteristic data of the copolymers A' obtained.

TABLE I

| Copolymers | $A'_1$ | $A'_2$ | $A'_3$ | $A'_4$ | $A'_5$ | $A'_6$ | $A'_7$ | $A'_8$ | $A'_9$ | $A'_{10}$ |
|---|---|---|---|---|---|---|---|---|---|---|
| Part I | | | | | | | | | | |
| Xylene | 1,200 | 1,200 | 1,200 | 1,200 | 1,200 | 1,200 | 1,200 | 1,200 | 1,200 | 1,200 |
| Part II | | | | | | | | | | |
| Ethyl acrylate | 279 | — | — | — | — | — | 312 | — | — | — |
| Butyl acrylate | — | — | — | 657 | — | — | — | — | — | 470 |
| 2-ethylhexyl-acrylate | 328 | — | — | — | — | — | — | 837 | — | — |
| Methyl methacrylate | 493 | 411 | — | 263 | — | — | — | — | — | 34 |
| Butyl methacrylate | — | — | 903 | — | — | 903 | 575 | — | 862 | — |
| 2-ethylhexyl-methacrylate | — | 591 | — | — | 903 | — | — | — | — | — |
| Styrene | 493 | 575 | 657 | 624 | 624 | 616 | 624 | 657 | 616 | 718 |
| Maleic anhydride | 49 | 66 | 82 | 99 | 115 | 123 | 131 | 148 | 164 | 34 |
| Hydroxypropyl methacrylate | — | — | — | — | — | — | — | — | — | 386 |
| Part II | | | | | | | | | | |
| Tert. butylperoxy-2-ethyl hexanoate (70%) | 98 | 98 | 98 | 98 | 98 | 98 | 98 | 98 | 98 | 98 |
| Xylene | 60 | 59 | 60 | 59 | 60 | 60 | 60 | 60 | 60 | 60 |
| Polymerization temperature (°C.) | 125 | 125 | 125 | 125 | 125 | 125 | 125 | 125 | 125 | 125 |
| Solids content (%) | 55.6 | 55.9 | 55.4 | 55.2 | 55.5 | 55.3 | 54.7 | 54.6 | 55.7 | 55.5 |
| Viscosity (23° C., mPa · s) | 274 | 512 | 590 | 324 | 280 | 787 | 371 | 198 | 1193 | 1049 | which may be passed either through or over the reaction mixture.

After the modification reaction, it is possible, if necessary, to remove excess diamine from the end product, by brief distillation, preferably azeotropic distillation with a suitable solvent such as xylene, butyl acetate, solvent naphtha and oxohexyl acetate.

The molecular weights ($M_w$) of the amino-functional copolymers A substantially correspond to the molecular weights of the anhydride-functional copolymers A', plus the calculated molecular weight of the diamines used, minus the quantity of water eliminated.

The amino-functional copolymers A according to the invention are readily soluble in organic solvents. They may be used, for example, as a binder or binder component in solvent-containing paints, coating compositions, sealing compositions, adhesives or printing inks.

In the following examples, all quantities in "parts" and "percent" are by weight, unless otherwise indicated.

EXAMPLES

EXAMPLE 1

General procedure for the production of anhydride-functional copolymers $A'_1$ to $A'_{10}$ Part I was introduced into a 4-liter reaction vessel equipped with a stirrer, cooling and heating system and

EXAMPLE 2

General procedure for the reaction of the anhydride-functional copolymers $A'_1$ to $A'_{10}$ with diamines to form the amino-functional copolymers $A_1$ to $A_{10}$ Part I was introduced into a 1 liter reaction vessel equipped with a stirrer, cooling and heating system and heated to the reaction temperature. Part II was then added with stirring over a period of 1.5 hours. After the addition of part II, the reaction mixture was heated to the reflux temperature and heated on a water separator until the theoretical quantity of water had been eliminated or until no more water was eliminated. The amino-functional copolymer formed was then be adjusted to the particular solids content required by distilling off solvent, if necessary.

The compositions of parts I and II and the reaction temperatures are set forth in Table II which also sets forth the characteristic data of the amino-functional copolymers obtained.

TABLE II

| Copolymers | $A'_1$ | $A'_2$ | $A'_3$ | $A'_4$ | $A'_5$ | $A'_6$ | $A'_7$ | $A'_8$ | $A'_9$ | $A'_{10}$ |
|---|---|---|---|---|---|---|---|---|---|---|
| Part I | | | | | | | | | | |
| Xylene | 200 | 200 | 200 | 200 | 200 | 200 | 200 | 200 | 200 | 200 |
| 1-amino-1-methyl-4(3)-aminomethyl | — | — | 24 | 29 | 33 | 36 | 38 | 43 | 48 | 10 |

TABLE II-continued

| Copolymers | $A'_1$ | $A'_2$ | $A'_3$ | $A'_4$ | $A'_5$ | $A'_6$ | $A'_7$ | $A'_8$ | $A'_9$ | $A'_{10}$ |
|---|---|---|---|---|---|---|---|---|---|---|
| | | | (Quantities in g) | | | | | | | |
| cyclohexane | | | | | | | | | | |
| 1-amino-3-aminomethyl-3,5,5-trimethyl cyclohexane | 17 | 22 | — | — | — | — | — | — | — | — |
| Part II | | | | | | | | | | |
| Copolymer | 500 | 500 | 500 | 500 | 500 | 500 | 500 | 500 | 500 | 500 |
| | $A'_1$ | $A'_2$ | $A'_3$ | $A'_4$ | $A'_5$ | $A'_6$ | $A'_7$ | $A'_8$ | $A'_9$ | $A'_{10}$ |
| Reaction temp. (°C.) | 100 | 120 | 100 | 100 | 100 | 100 | 100 | 100 | 100 | 100 |
| Quantity of water eliminated | 1.4 | 1.9 | 2.2 | 3.0 | 3.3 | 3.4 | 3.8 | 4.5 | 4.8 | 1.0 |
| Quantity of xylene distilled off | 225 | 185 | 225 | 215 | 115 | 110 | 110 | 230 | 205 | 235 |
| Solids content (%) | 59.7 | 54.8 | 60.1 | 59.6 | 50.6 | 50.2 | 50.1 | 61.3 | 60.0 | 60.1 |
| Visc. (23° C., mPa · s) | 7674 | 33790 | 4200 | 12100 | 29100 | 23800 | 13500 | 54200 | 5750 | 62870 |
| Contents of NH2 groups, based on solid resin (%) | 0.44 | 0.56 | 0.76 | 0.91 | 1.04 | 1.11 | 1.18 | 1.32 | 1.42 | 0.33 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A copolymer which is readily soluble in organic solvents, has a weight average molecular weight ($M_w$) of 1500 to 75,000, is prepared from olefinically unsaturated compounds and contains 0.1 to 4.5% by weight of primary amino groups in the form of structural units corresponding to formula I

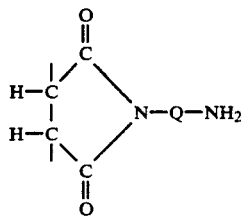

(I)

wherein
Q is a saturated aliphatic-cycloaliphatic hydrocarbon radical obtained by removing the amino groups from an aliphatic-cycloaliphatic diprimary diamine containing an amino group attached to a primary carbon atom and an amino group attached to a secondary or tertiary carbon atom.

2. The copolymer of claim 1 which contains 0.3 to 3.0% by weight of primary amino groups in the form of structural units corresponding to formula V

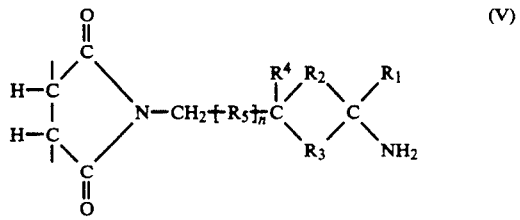

(V)

wherein
$R_1$ is hydrogen or a $C_{1-4}$ alkyl radical,
$R_2$ and $R_3$ may be the same or different and represent a difunctional, saturated, aliphatic hydrocarbon radical containing 1 to 6 carbon atoms, the sum of the number of carbon atoms in $R_2$ and $R_3$ being from 3 to 8,
$R_4$ is hydrogen or a $C_{1-4}$ alkyl radical,
$R_5$ is a difunctional, saturated, aliphatic hydrocarbon radical containing 1 to 4 carbon atoms and
n is 0 to 1.

3. The copolymer of claim 2 wherein
$R_1$ is hydrogen or a methyl radical,
$R_2$ and $R_3$ may be the same or different and represent a difunctional, saturated, aliphatic hydrocarbon radical containing 1 to 5 carbon atoms, the sum of the number of carbon atoms in $R_2$ and $R_3$ being from 4 to 6,
$R_4$ is hydrogen or a methyl radical,
$R_5$ is a difunctional, saturated, aliphatic hydrocarbon radical containing 1 to 3 carbon atoms and
n is 0 or 1.

* * * * *